United States Patent
Assem et al.

(10) Patent No.: US 9,232,049 B2
(45) Date of Patent: Jan. 5, 2016

(54) QUALITY OF EXPERIENCE DETERMINATION FOR MULTI-PARTY VOIP CONFERENCE CALLS THAT ACCOUNT FOR FOCUS DEGRADATION EFFECTS

(71) Applicant: INTERNATIONAL BUSINESS MACHINES CORPORATION, Armonk, NY (US)

(72) Inventors: Haytham Assem, Dublin (IE); Jonathan Dunne, Dungarvan (IE); James P. Galvin, Georgetown, KY (US); Patrick O'Sullivan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 14/290,165

(22) Filed: May 29, 2014

(65) Prior Publication Data

US 2015/0156324 A1 Jun. 4, 2015

Related U.S. Application Data

(63) Continuation of application No. 14/096,153, filed on Dec. 4, 2013.

(51) Int. Cl.
*G01R 31/08* (2006.01)
*H04M 3/22* (2006.01)
(Continued)

(52) U.S. Cl.
CPC .............. *H04M 3/2227* (2013.01); *H04M 3/56* (2013.01); *H04M 7/006* (2013.01)

(58) Field of Classification Search
CPC . H04L 65/1069; H04L 65/80; H04L 29/0602; H04L 47/11; H04L 47/26; H04L 47/24; H04L 43/0888; H04L 65/4084; H04L 65/605; G10L 25/69
See application file for complete search history.

(56) References Cited

U.S. PATENT DOCUMENTS

| 7,058,048 B2 | 6/2006 | Clark |
| 7,499,415 B2 | 3/2009 | Dhesikan et al. |

(Continued)

FOREIGN PATENT DOCUMENTS

| CN | 101151858 A | 3/2008 |
| CN | 103916823 A | 7/2014 |

(Continued)

OTHER PUBLICATIONS

Adel et al. Improved E-model for monitoring Quality of Multi-Party VoIP communications; TSSG, Waterford institute of Technology, Ireland; pp. 1-6.

*Primary Examiner* — Jung-Jen Liu
(74) *Attorney, Agent, or Firm* — Patents on Demand P.A.; Brian K. Buchheit; Scott M. Garrett (57) ABSTRACT

In one embodiment, the quality of experience for a multi-part conference call is determined. Values for network characteristics for a conference call between at least three parties is captured using a multi-party conference call system. The network characteristics encompasses at least parameters expressed in an E-Model R-Factor equation. A quality of experience (QoE) is determined that accounts for degradation effects. The determined QoE is represented as a corrected mean opinion score (MOS) perceived by the receiving party. A controllable parameter of the conference call is dynamically and automatically modified to positively affect the determined QoE of the receiving party when the QoS is below a designated minimal QoE threshold.

13 Claims, 3 Drawing Sheets

(51) Int. Cl.
*H04M 3/56* (2006.01)
*H04M 7/00* (2006.01)

(56) References Cited

U.S. PATENT DOCUMENTS

| | | |
|---|---|---|
| 7,756,138 B2 | 7/2010 | Dhesikan et al. |
| 7,830,860 B2 | 11/2010 | Farris et al. |
| 7,889,636 B2 | 2/2011 | Dhesikan et al. |
| 7,916,645 B2 | 3/2011 | Dhesikan et al. |
| 7,974,212 B2 | 7/2011 | Yang et al. |
| 8,027,267 B2 * | 9/2011 | Denby et al. ............. 370/252 |
| 8,050,921 B2 | 11/2011 | Mark et al. |
| 8,194,565 B2 | 6/2012 | Goodman |
| 8,218,458 B2 | 7/2012 | Flynn et al. |
| 8,488,473 B2 | 7/2013 | Ota et al. |
| 8,526,336 B2 | 9/2013 | Sarkar et al. |
| 2006/0268678 A1 | 11/2006 | Dhesikan et al. |
| 2006/0268683 A1 | 11/2006 | Dhesikan et al. |
| 2006/0268693 A1 | 11/2006 | Dhesikan et al. |
| 2006/0268694 A1 | 11/2006 | Dhesikan et al. |
| 2006/0268695 A1 | 11/2006 | Dhesikan et al. |
| 2006/0268824 A1 | 11/2006 | Dhesikan et al. |
| 2007/0064616 A1 * | 3/2007 | Miranda et al. ............. 370/250 |
| 2008/0063173 A1 | 3/2008 | Sarkar et al. |
| 2008/0212567 A1 * | 9/2008 | El-Hennawey et al. ...... 370/352 |
| 2010/0029266 A1 * | 2/2010 | van Gassel et al. .......... 455/424 |
| 2012/0013748 A1 * | 1/2012 | Stanwood et al. ............. 348/192 |
| 2012/0250678 A1 * | 10/2012 | Sabella et al. .............. 370/352 |
| 2012/0300769 A1 * | 11/2012 | Narbutt ...................... 370/352 |
| 2013/0051271 A1 * | 2/2013 | Cao et al. ................... 370/252 |
| 2013/0114482 A1 * | 5/2013 | Oh et al. ..................... 370/310 |
| 2013/0155866 A1 * | 6/2013 | Sun et al. .................... 370/241 |
| 2013/0156119 A1 * | 6/2013 | Poulin ......................... 375/259 |
| 2013/0262128 A1 * | 10/2013 | Teutsch et al. ............... 704/500 |
| 2013/0290525 A1 * | 10/2013 | Fedor et al. .................. 709/224 |
| 2014/0016464 A1 * | 1/2014 | Shirazipour et al. ......... 370/235 |
| 2014/0229614 A1 * | 8/2014 | Aggarwal et al. ............. 709/224 |
| 2014/0317288 A1 * | 10/2014 | Krueger et al. ............... 709/224 |
| 2014/0348156 A1 * | 11/2014 | Zheng et al. ................. 370/352 |
| 2015/0098352 A1 * | 4/2015 | Froehlich ..................... 370/252 |

FOREIGN PATENT DOCUMENTS

| | | |
|---|---|---|
| EP | 1884086 A1 | 2/2008 |
| EP | 2050264 A2 | 4/2009 |
| EP | 2119108 A1 | 11/2009 |
| EP | 2050264 A4 | 12/2010 |
| EP | 2050264 B1 | 6/2012 |
| WO | 2006127328 A1 | 11/2006 |
| WO | 2008020928 A2 | 2/2008 |
| WO | 2008020928 A3 | 4/2008 |

* cited by examiner

```
Calculates the MOS for the receiving party
using the E-Model R-Factor equation and      ----  $R = R_0 - I_s - I_d - I_{e,eff} + A$
network characteristics
                                    305            R-Factor Equation  325
            ↓
Identifies the codec being used for the
receiving party
                                    310
                                            330        Focus-Effect Coefficients  333
            ↓                                      |       | x1   | x2     | x3    | x4     |
Obtains focus-effect coefficients for the          | SILK  | 0.26 | -1.982 | 5.769 | -4.748 |
identified codec from the focus-effect table  ---
                                    315     Codec
                                            337
            ↓
Calculates the corrected MOS for the
receiving party using the correction function  --- $MOS_C = x1 * MOS^3 + x2 * MOS^2 +$
and obtained focus-effect coefficients              $x3 * MOS + x4$
                                    320
                                                   Correction Function  340
```

FIG. 3

QUALITY OF EXPERIENCE DETERMINATION FOR MULTI-PARTY VOIP CONFERENCE CALLS THAT ACCOUNT FOR FOCUS DEGRADATION EFFECTS

CROSS-REFERENCE TO RELATED APPLICATIONS

This application is a continuation of U.S. patent application Ser. No. 14/096,153, filed Dec. 4, 2013 (pending), which is incorporated herein in its entirety.

BACKGROUND

The present invention relates to the field of conference calls and, more particularly, to the quality of experience (QoE) determination for multi-party VoIP conference calls that account for focus degradation effects.

In recent years, the use of Voice over Internet Protocol (VoIP) for voice communications has proliferated in both the private and corporate sectors. The success achieved by basic two-party VoIP communication, in terms of reliability and cost-savings, has encouraged multi-party (i.e., three or more party) VoIP conferencing products like SKYPE. Maintaining a good quality of experience (QoE) for the participants of the conference call is a priority and a challenge for multi-party VoIP conference call systems, as the QoE is typically directly related to use and revenue.

Conventional approaches to monitoring the QoE of a multi-party conference call utilize the same processes as two-party or peer-to-peer conference calls. Thus, conventional approaches fail to address differences in degradation factors between the multiple connections. That is, the network connection between User A and User B is subject to a first set of degradation factors; the connection between User A and User C a second set of degradation factors; and so on.

Further, in multi-party conference call systems that utilize a centralized connection topology, these conventional approaches fail to take into account negative effects of the focus (e.g., the central point of control that all communications pass through) upon the QoE of the conference call. This centralized focus component transcodes a received signal before re-encoding and distributing the signal to the other parties. The transcoding process, therefore, affects the signal provided to a user, and, by extension, the QoE perceived by that user.

BRIEF SUMMARY

One aspect of the present invention can include a method for determining the quality of experience for a multi-party conference call. Such a method can begin with capturing the values for network characteristics for a conference call between three or more parties made using a multi-party conference call system in real-time or near real-time. The network characteristics can encompass the parameters expressed in the E-Model R-Factor equation. The multi-party conference call system can utilize a centralized focus component through which signals comprising the conference call are received from and sent to the parties participating in the conference call, and Voice over Internet Protocol (VoIP). A quality of experience (QoE) that accounts for degradation effects of the centralized focus component can be determined for each party that is currently receiving a signal from the centralized focus component. The determined QoE can be represented as a corrected mean opinion score (MOS) perceived by the receiving party. When the determined QoE for the receiving party is below a predetermined threshold value, a controllable parameter of the conference call can be automatically and dynamically modified to positively affect the determined QoE of the receiving party.

Another aspect of the present invention can include a system for improved QoE multi-party conference calls. Such a system can include a multi-party VoIP conference call system having a centralized focus component and an improved QoE manager. The multi-party conference call system can be configured to facilitate an exchange of signals between three or more parties over at least one network. The centralized focus component can be configured to receive and distribute the data signals among the parties using a transcoding process. The improved quality of experience (QoE) manager can be configured to assess a QoE for each party when receiving a data signal. The QoE can be expressed as a corrected mean opinion score (MOS) that accounts for degradation effects introduced by the transcoding process of the centralized focus component. The determination of the corrected MOS can be based upon the E-Model R-Factor equation.

Yet another aspect of the present invention can include a computer program product that includes a computer readable storage medium having embedded computer usable program code. The computer usable program code can be configured to capture values for the network characteristics for a conference call between three or more parties made using a multi-party conference call system in real-time or near real-time. The network characteristics can encompass parameters expressed in the E-Model R-Factor equation. The multi-party conference call system can utilize a centralized focus component through which signals comprising the conference call are received from and sent to the parties participating in the conference call, and Voice over Internet Protocol (VoIP). The computer usable program code can be configured to determine a quality of experience (QoE) that accounts for degradation effects of the centralized focus component for each party that is currently receiving a signal from the centralized focus component as part of the conference call. The determined QoE can be represented as a corrected mean opinion score (MOS) perceived by the receiving party. Further, the computer usable program code can be configured to, when the determined QoE of the conference call for the receiving party is below a predetermined threshold value, automatically and dynamically modify a controllable parameter of the conference call to positively affect the determined QoE of the receiving party.

DETAILED DESCRIPTION

The present invention discloses a solution for providing a mean opinion score (MOS) for a multi-party conference call that accounts for the degradation effects introduced by the focus component of a multi-party VoIP conference calling system. For each party of the conference call receiving an audio signal, an improved quality of experience (QoE) manager can use the MOS corresponding to an R-value calculated using the E-Model R-Factor equation and a set of predetermined focus-effect coefficients as input to a correction function that produces a corrected MOS that represents the QoE perceived by the receiving party.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
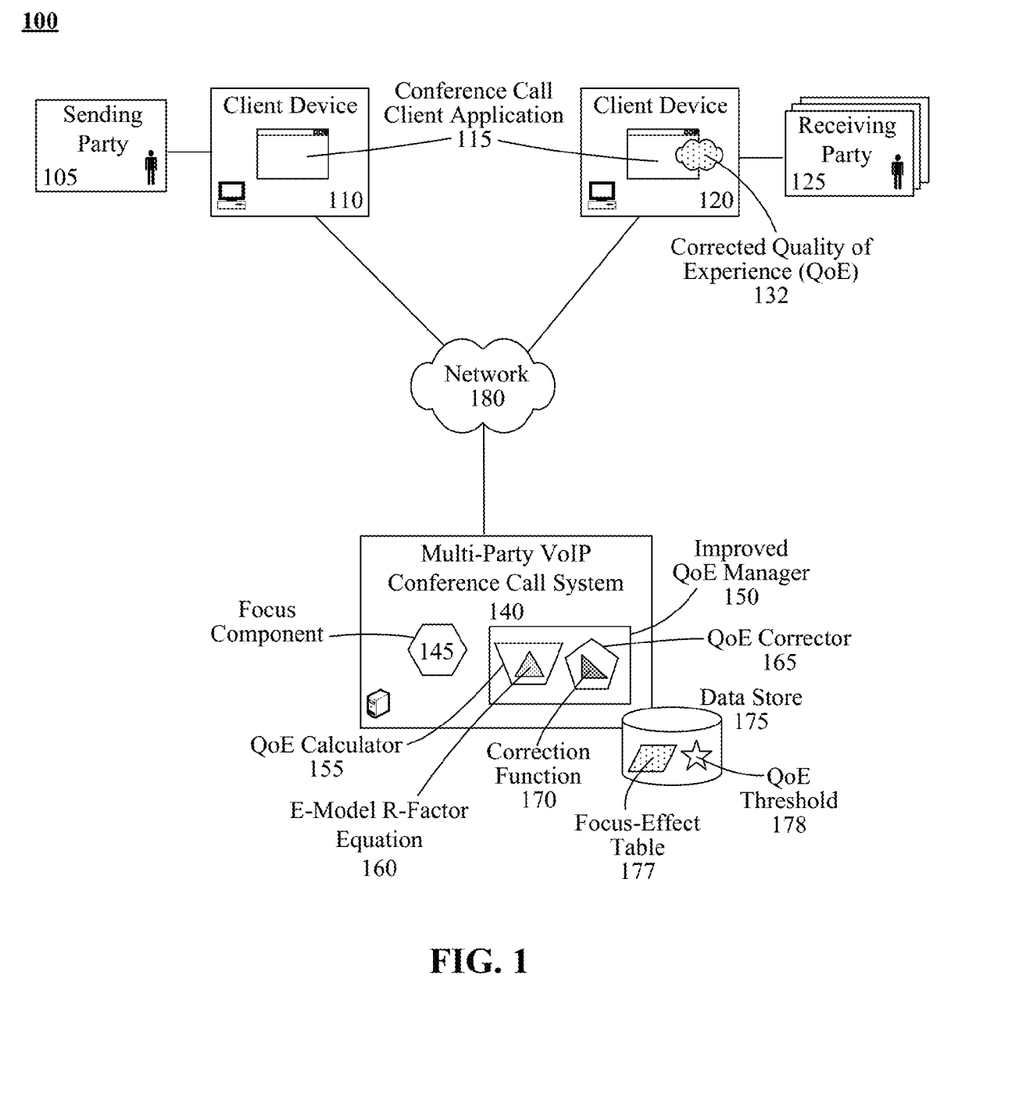
FIG. 1 is a schematic diagram illustrating a system that provides a quality of experience (QoE) for parties of a conference call that is corrected for degradation effects introduced by the focus component of a centralized multi-party Voice over Internet (VoIP) conference call system in accordance with embodiments of the inventive arrangements disclosed herein.

FIG. 1 is a schematic diagram illustrating a system 100 that provides a quality of experience (QoE) 132 for parties 105 and 125 of a conference call that is corrected for degradation effects introduced by the focus component 145 of a centralized multi-party Voice over Internet (VoIP) conference call system 140 in accordance with embodiments of the inventive arrangements disclosed herein. In system 100, the parties 105 and 125 can participate in a conference call supported by the multi-party VoIP conference call system 140.

The parties 105 and 125 can represent a single individual or a group of co-located individuals. In system 100, the parties 105 and 125 can be distinguished as a sending party 105 or a receiving party 125. The sending party 105 can be the party that is currently generating an audio signal for the conference call. The receiving party 125 can be those parties that are receiving an audio signal from the multi-party VoIP conference call system 140. This distinction can be required for the sake of discussion of the present disclosure as the multi-party VoIP conference call system 140 can be concerned with monitoring the corrected QoE 132 of only the receiving party 125. It should be noted, however, that the distinction between sending 105 and receiving parties 125 can be fluid during the conference call as the parties 105 and 125 shift between talking and listening.

Each party 105 and 125 can participate in the conference call via a conference call client application 115, herein referred to as the client application 115. The client application 115 can operate upon a suitable client device 110 and 120. The client device 110 and 120 can represent a variety of electronic or computing devices capable of supporting operation of the client application 115 and communicating with the multi-party VoIP conference call system 140 over a network 180. Therefore, the client device 110 and 120 can include the hardware and/or software required to support the playback and/or capture of at least audio signals (e.g., speakers, microphone, device driver programs, etc.).

Examples of a client device 110 and 120 can include, but are not limited to, a desktop computer, a laptop computer, a tablet computer, a notebook computer, a Web-enabled smartphone, an E-reader device, a conference call system comprised of a computing device interconnected with various specialty devices (i.e., a VoIP conference call phone), and the like.

The multi-party VoIP conference call system 140 can represent the hardware and/or software components required to provide the functionality that supports a conference call between at least three participating parties 105 and 125 using a centralized call topology. Since multi-party VoIP conference call systems 140 and the concept of the centralized call topologies are well known in the art, only elements pertinent to the present disclosure can be illustrated and/or discussed herein.

The components of note of the multi-party VoIP conference call system 140 can include a focus component 145 and an improved QoE manager 150. In a multi-party VoIP conference call system 140 that utilizes a centralized call topology, the focus component 145, also referred to as a multipoint control unit (MCU) in literature, can be a dedicated media server or appropriately-enabled client device 110 and 120. The purpose of the focus component 145 can be to act as a central point through which all audio signals are received and distributed.

Audio signals received by the focus component 145 can undergo a process called transcoding. In the transcoding process, the focus component 145 can decode received audio signals, mix multiple audio signals, when necessary (i.e., multiple sending parties 105), and then re-encode the [mixed] audio signal for transmission to the receiving parties 125.

The improved QoE manager 150 can be a component of the multi-party VoIP conference call system 140 that estimates a corrected QoE 132 for each receiving party 125. Most conventional multi-party VoIP conference call systems 140 have a component that monitors the QoE throughout the conference call, taking steps to mitigate decreases QoE, when necessary. The improved QoE manager 150 can perform these same functions, but in a manner that accounts for degradation effects introduced by the transcoding process of the focus component 145; hence, the QoE 132 can be corrected for transcoding degradation.

The QoE and, by extension, the corrected QoE 132, can be the subjective perception of call quality by the receiving party 125. Conventional approaches to conference call QoE assessment can utilize offline analysis of recordings like the Perceptual Evaluation of Speech Quality (PESQ) and feedback from the receiving party 125. Real-time (or near real-time) assessment can utilize the R-Factor equation 160 of the E-Model authored by the International Telecommunication Union (ITU). The R-Factor equation 160 can be an expression for speech quality evaluation of a VoIP peer-to-peer call and is valid for only ITU codecs, limiting its usability with other popular VoIP codecs and multi-party conference calls.

The improved QoE manager 150 can address these shortcomings of the R-Factor equation to broaden its scope to non-ITU codecs and a multi-party conference call environment. Since the R-Factor equation was created for a peer-to-peer call topology, it can lack variables to account for signal degradation effects introduced by the transcoding process of the focus component 145 in a multi-party VoIP conference call system 140. Thus, the improved QoE manager 150 can include both a QoE calculator 155 in conjunction with a QoE corrector 165 to produce the corrected QoE 132.

The QoE calculator 155 can calculate the QoE for each receiving party 125 using the R-Factor equation 160. It is important to emphasize that the R-Factor equation 160 can be applied to each receiving party 125 independently to account for differences in network characteristics between the multi-party VoIP conference call system 140 and each receiving party 125.

The QoE corrector 165 can use the QoE produced by the QoE calculator 155 as input to a correction function 170. The correction function 170 can be a mathematical model developed to adjust the QoE determined by the R-Factor equation 160 for the effects of the focus component 145 upon the audio signal delivered to a receiving party 125. The correction function 170 can also utilize information obtained from a focus-effect table 177 in its calculation.

The focus-effect table 177 can be stored in a data store 175 accessible to the QoE corrector 165. The focus-effect table 177 can contain codec-specific coefficient data for use with the correction function 170 to calculate the corrected QoE 132. The derivation used to determine the coefficients contained in the focus-effect table 177 can be explained in the paper, "Improved E-Model for Monitoring Quality of Multi-Party VoIP Communications".

The improved QoE manager 150 can then use the corrected QoE 132, instead of the QoE determined with the R-Factor equation 160 by the QoE calculator 155, to perform other QoE-related functions. For example, as in many conventional conference call systems, the improved QoE manager 150 can compare the corrected QoE 132 to a preset QoE threshold 178. The QoE threshold 178 can be a value that expresses the minimum allowed corrected QoE 132. Should the corrected QoE 132 fall below the QoE threshold 178, the improved QoE manager 150 can perform additional actions to raise the corrected QoE 132 for that receiving party 125.

In another embodiment, the improved QoE manager 150 can be implemented as a plug-in component to an existing QoE component of the multi-party VoIP conference calling system 140. In such an embodiment, the improved QoE manager 150 can need only contain the QoE calculator 155 and focus-effect table 177 and would use the QoE determined by the existing component to calculate the corrected QoE 132.

In yet another embodiment, the improved QoE manager 150 can be implemented as a plug-in component to the multi-party VoIP conference calling system 140 that replaces an existing QoE component or provides real-time QoE monitoring the the multi-party VoIP conference calling system 140.

In another contemplated embodiment, the multi-party VoIP conference call system 140 can utilize a hybrid call topology. In such an embodiment, the functionality of the improved QoE manager 150 can be distributed to those nodes of the multi-party VoIP conference call system 140 that have the capability of acting as a focus component 145.

It should be noted that, while the present disclosure is focused on the corrected QoE 132 of only the audio portion of a conference call, the techniques taught in the present disclosure can be extended to be used with conference calls that utilize both audio and video. That is, the present disclosure can be used to provide a corrected QoE 132 for the audio portion of the video conference call. Alternately, the methodology employed to achieve the correction function 170 and/or the coefficients of the focus-effect table 177 can be utilized to produce similar elements for video codecs.

As used herein, presented data store 175 can be a physical or virtual storage space configured to store digital information. Data store 175 can be physically implemented within any type of hardware including, but not limited to, a magnetic disk, an optical disk, a semiconductor memory, a digitally encoded plastic memory, a holographic memory, or any other recording medium. Data store 175 can be a stand-alone storage unit as well as a storage unit formed from a plurality of physical devices. Additionally, information can be stored within data store 175 in a variety of manners. For example, information can be stored within a database structure or can be stored within one or more files of a file storage system, where each file may or may not be indexed for information searching purposes. Further, data store 175 can utilize one or more encryption mechanisms to protect stored information from unauthorized access.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

Figure 2:
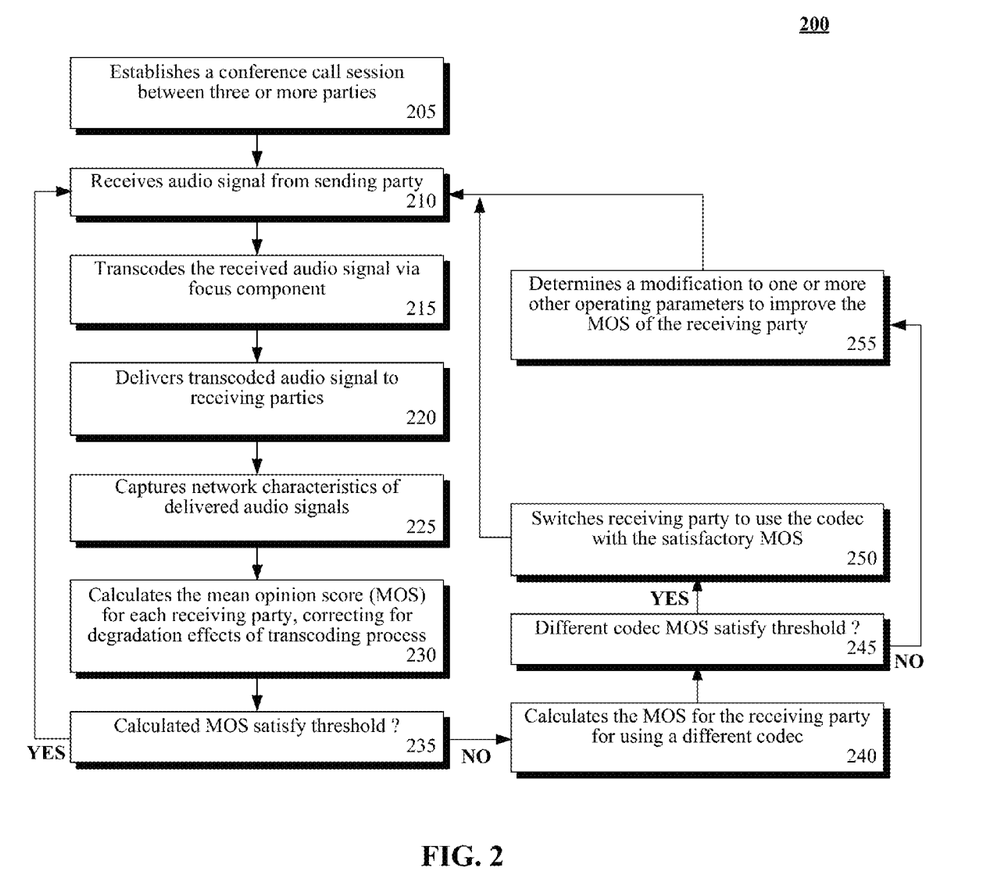
FIG. 2 is a flowchart of a method expressing the general operation of a multi-party VoIP conference calling system that utilizes an improved QoE manager in accordance with an embodiment of the inventive arrangements disclosed herein.

FIG. 2 is a flowchart of a method 200 expressing the general operation of a multi-party VoIP conference calling system that utilizes an improved QoE manager in accordance with embodiments of the inventive arrangements disclosed herein. Method 200 can be performed within the context of system 100.

Method 200 can begin in step 205 where the multi-party VoIP conference calling system can establish a conference call session between three or more parties. An audio signal can be received from a sending party in step 210. In step 215, the received audio signal can be transcoded by the focus component.

The transcoded audio signal can be delivered to the receiving parties in step 220. In step 225, the mean opinion score (MOS) can be calculated and corrected for the degradation effects of the transcoding process for each receiving party. MOS can be well-known in the art as a subjective measurement of audio quality recommended by the ITU and can be used interchangeably with QoE (i.e., QoE is expressed in terms of MOS). The result of the R-Factor equation can be mapped to a value on the MOS scale.

It can be determined if the calculated MOS satisfies the preset QoE threshold in step 235. When the calculated MOS satisfies the QoE threshold, the multi-party VoIP conference calling system can continue its normal operation with the flow of method 200 returning to step 210 to handle the next audio signal.

When the calculated MOS value does not satisfy the QoE threshold, the multi-party VoIP conference calling system can task actions to improve the MOS like step 240 where the MOS of the receiving party can be calculated for a different codec supported by the multi-party VoIP conference calling system. It can then be determined if the MOS of the different codec satisfies the QoE threshold in step 245.

When the MOS calculated for the different codec satisfies the QoE threshold, step 250 can be performed where the receiving party can be switched to using the different codec. When the MOS calculated for the different codec does not satisfy the QoE threshold, a modification to one or more other operating parameters can be determined to improve the MOS of the receiving party in step 255. For step 250 or 255, flow of method 200 can return to step 210 to handle the next audio signal.

Figure 3:
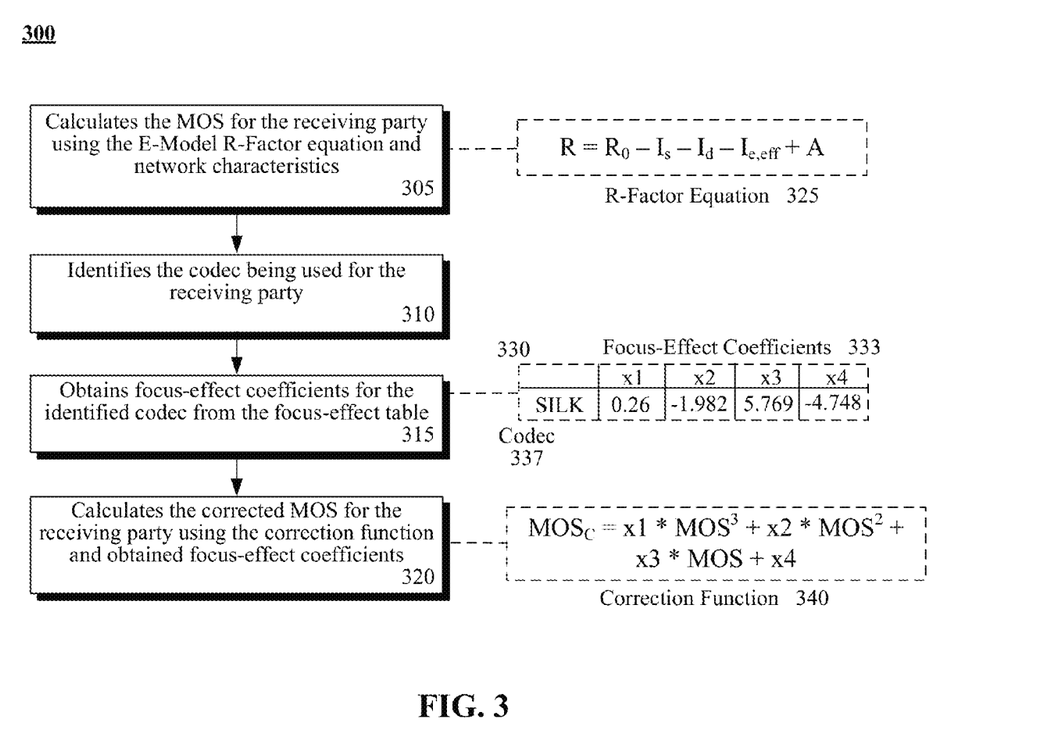
FIG. 3 is an annotated flowchart of a method describing the calculation of the corrected QoE by the improved QoE manager in accordance with an embodiment of the inventive arrangements disclosed herein.

FIG. 3 is an annotated flowchart of a method 300 describing the calculation of the corrected QoE by the improved QoE manager in accordance with embodiments of the inventive arrangements disclosed herein. Method 300 can be performed within the context of system 100 and/or method 200.

Method 300 can begin in step 305 where the improved QoE manager can calculate the MOS of the receiving party using the E-Model R-Factor equation 325 and network characteristics. The terms of the R-Factor equation 325 can represent the following parameters: $R_o$—the basic signal-to-noise ratio; $I_s$—all impairments that occur substantially simultaneous with the voice signal; $I_d$—all impairments due to delay; $I_{e,\mathit{eff}}$—effective equipment impairment factor; and, A—advantage of access factor.

The codec being used for the receiving party can be identified in step 310. In step 315, the focus-effect coefficients 333 for the identified codec 337 can be obtained from the focus-effect table 330. The example focus-effect table 330 shown for method 300 can indicate the focus-effect coefficients 333 (x1, x2, x3, and x4) for the SILK codec 337 used by the SKYPE multi-party VoIP conference calling system. As previously mentioned, the derivation of the values for the focus-effect coefficients 333 can be detailed in the paper, "Improved E-Model for Monitoring Quality of Multi-Party VoIP Communications".

The corrected MOS for the receiving party can then be calculated using the correction function 340 in step 320. As shown, the correction function 340 can be a third degree function based upon the MOS calculated using the R-Factor equation 325 and the focus-effect coefficients 333 for the codec 337.

As an example of use, a peer-to-peer conference call can have a calculated MOS of 4.2, which is subjectively of good quality. Using this same conference call, in terms of network impairment characteristics (i.e., calculates to the same R, maps to same MOS), in a multi-party setting (i.e., the peer-to-peer can represent a single focus-to-receiving party relationship), the conference call would have a corrected MOS of 3.8, which is only of fair quality.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining the quality of experience for a multi-party conference call comprising:

capturing values for a plurality of network characteristics for a conference call between at least three parties made using a multi-party conference call system in at least one of real-time and near real-time, wherein said plurality of network characteristics encompass at least parameters expressed in an E-Model R-Factor equation, wherein said multi-party conference call system utilizes a centralized focus component through which signals comprising the conference call are received from and sent to the at least three parties participating in the conference call, wherein the multi-party conference call system utilizes a Voice over Internet Protocol (VoIP);

determining a quality of experience (QoE) that accounts for degradation effects of the centralized focus component for each party of the at least three parties that is currently receiving a signal from the centralized focus component as part of the conference call, wherein the determined QoE is represented as a corrected mean opinion score (MOS) perceived by the receiving party; and when the determined QoE of the conference call for the receiving party is below a predetermined threshold value, automatically and dynamically modifying a controllable parameter of the conference call to positively affect the determined QoE of the receiving party, wherein the controllable parameter of the conference call includes the codec being used for a receiving party, said modification of the controllable parameter further comprises:

performing the determination of the QoE for at least one other codec supported by the multi-party conference call system using the values of the plurality of network characteristics used in the determination of the QoE for the codec currently being used for the receiving party;

comparing the QoE of the codec currently being used to the QoE of the at least one other codec; and when the QoE of one of the at least one other codec is deemed better than the QoE of the codec currently being used, proposing a switch from the codec currently being used for the receiving party to the at least one other codec having the better QoE as the modification to the controllable parameter.

2. The method of claim 1, wherein determining the QoE further comprises:

calculating a MOS for each receiving party using the captured network characteristics values using the R-Factor equation of the E-Model, wherein the degradation effects of the centralized focus component are unrepresented in said R-Factor equation; and calculating the corrected MOS for each receiving party using a correction function, wherein the correction function utilizes, as inputs, the MOS calculated using the R-Factor formula and a set of predetermined focus-effect coefficients for a codec being used for the receiving party.

3. The method of claim 2, wherein the correction function is expressed as $$MOS_C = x1*MOS^3 + x2*MOS^2 + x3*MOS + x4,$$

wherein $MOS_C$ is the corrected MOS, x1, x2, x3, and x4 correspond to the set of predetermined focus-effect coefficients for the codec used for each receiving party, and MOS corresponds to the MOS calculated using the R-Factor equation.

4. The method of claim 3, wherein calculating the corrected MOS further comprises:

identifying the codec being used by the multi-party conference call system for each receiving party; and obtaining the set of predetermined focus-effect coefficients for the identified codec from a focus-effect coefficient table, said table containing the set of predetermined focus-effect coefficients for a plurality of codecs.

5. The method of claim 3, wherein the codec being used for the receiving party is one of G.711, Internet Low-Bitrate Codec (ILBC), and SILK.

6. The method of claim 1, wherein the degradation effects comprise a Focus-Transcoding Effect (FTE) and a Focus-Forwarding Effect (FFE).

7. The method of claim 1, wherein the determining step is performed by an improved QoE manager component of the multi-party conference call system, wherein said improved QoE manager is a replacement to an existing QoE handling component or an additional component that operates in conjunction with the existing QoE handling component.

8. A method for determining the quality of experience for a multi-party conference call comprising:

capturing values for a plurality of network characteristics for a conference call between at least three parties made using a multi-party conference call system in at least one of real-time and near real-time, wherein said plurality of network characteristics encompass at least parameters expressed in an E-Model R-Factor equation, wherein said multi-party conference call system utilizes a centralized focus component through which signals comprising the conference call are received from and sent to the at least three parties participating in the conference call, wherein the multi-party conference call system utilizes a Voice over Internet Protocol (VoIP);

determining a quality of experience (QoE) that accounts for degradation effects of the centralized focus component for each party of the at least three parties that is currently receiving a signal from the centralized focus component as part of the conference call, wherein the determined QoE is represented as a corrected mean opinion score (MOS) perceived by the receiving party, wherein determining the QoE further comprises:

calculating a MOS for each receiving party using the captured network characteristics values using the R-Factor equation of the E-Model, wherein the degradation effects of the centralized focus component are unrepresented in said R-Factor equation; and calculating the corrected MOS for each receiving party using a correction function, wherein the correction function utilizes, as inputs, the MOS calculated using the R-Factor formula and a set of predetermined focus-effect coefficients for a codec being used for the receiving party, wherein the correction function is expressed as $$MOS_C = x1*MOS^3 + x2*MOS^2 + x3*MOS + x4,$$

wherein $MOS_C$ is the corrected MOS, x1, x2, x3, and x4 correspond to the set of predetermined focus-effect coefficients for the codec used for each receiving party, and MOS corresponds to the MOS calculated using the R-Factor equation; and when the determined QoE of the conference call for the receiving party is below a predetermined threshold value, automatically and dynamically modifying a controllable parameter of the conference call to positively affect the determined QoE of the receiving party.

9. The method of claim 8, wherein calculating the corrected MOS further comprises:
   identifying the codec being used by the multi-party conference call system for each receiving party; and
   obtaining the set of predetermined focus-effect coefficients for the identified codec from a focus-effect coefficient table, said table containing the set of predetermined focus-effect coefficients for a plurality of codecs.

10. The method of claim 8, wherein the codec being used for the receiving party is one of G.711, Internet Low-Bitrate Codec (ILBC), and SILK.

11. The method of claim 8, wherein the controllable parameter of the conference call includes the codec being used for a receiving party, said modification of the controllable parameter further comprises:
   performing the determination of the QoE for at least one other codec supported by the multi-party conference call system using the values of the plurality of network characteristics used in the determination of the QoE for the codec currently being used for the receiving party;
   comparing the QoE of the codec currently being used to the QoE of the at least one other codec; and
   when the QoE of one of the at least one other codec is deemed better than the QoE of the codec currently being used, proposing a switch from the codec currently being used for the receiving party to the at least one other codec having the better QoE as the modification to the controllable parameter.

12. The method of claim 8, wherein the degradation effects comprise a Focus-Transcoding Effect (FTE) and a Focus-Forwarding Effect (FFE).

13. The method of claim 8, wherein the determining step is performed by an improved QoE manager component of the multi-party conference call system, wherein said improved QoE manager is a replacement to an existing QoE handling component or an additional component that operates in conjunction with the existing QoE handling component.

* * * * *